US012405954B2

(12) United States Patent
Kumar et al.

(10) Patent No.: US 12,405,954 B2
(45) Date of Patent: Sep. 2, 2025

(54) GRAPH SEARCH DEVICE, GRAPH SEARCH SYSTEM, AND GRAPH SEARCH METHOD

(71) Applicant: Hitachi, Ltd., Tokyo (JP)

(72) Inventors: Amit Kumar, Tokyo (JP); Hideya Yoshiuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/522,397

(22) Filed: Nov. 29, 2023

(65) Prior Publication Data

US 2024/0202193 A1 Jun. 20, 2024

(30) Foreign Application Priority Data

Dec. 16, 2022 (JP) .................. 2022-200881

(51) Int. Cl.
*G06F 16/2455* (2019.01)
*G06F 16/2453* (2019.01)
*G06F 16/248* (2019.01)
*G06F 16/901* (2019.01)

(52) U.S. Cl.
CPC .... *G06F 16/2455* (2019.01); *G06F 16/24542* (2019.01); *G06F 16/248* (2019.01); *G06F 16/9024* (2019.01)

(58) Field of Classification Search
CPC .......... G06F 16/2455; G06F 16/24542; G06F 16/248; G06F 16/9024
See application file for complete search history.

(56) References Cited

U.S. PATENT DOCUMENTS

| | | | |
|---|---|---|---|
| 8,870,393 B2* | 10/2014 | Kawahara | H04N 9/3191 345/589 |
| 9,977,837 B2* | 5/2018 | Xu | G06F 16/2458 |
| 10,176,220 B2* | 1/2019 | Pirahesh | G06F 16/2453 |
| 10,303,688 B1* | 5/2019 | Sirin | G06N 5/01 |
| 10,409,782 B2* | 9/2019 | Zhang | G06F 16/9024 |
| 11,288,315 B2* | 3/2022 | Xu | G06F 16/2458 |
| 2018/0032930 A1* | 2/2018 | Kolb | G06F 40/253 |
| 2022/0247662 A1 | 8/2022 | Chen | |
| 2022/0414228 A1* | 12/2022 | Difonzo | G06F 16/24522 |

* cited by examiner

*Primary Examiner* — Debbie M Le
(74) *Attorney, Agent, or Firm* — MATTINGLY & MALUR, PC

(57) ABSTRACT

A graph search device includes: an existing information database storing existing information that includes a set of existing process graphs and a set of existing process tables; a query data management unit that acquires query data that includes a query graph and a query table; a structure comparison unit that determines, as a first search candidate, an existing process graph satisfying a predetermined structural similarity threshold value with respect to the query graph from among the set of existing process graphs; a content comparison unit that determines, as a second search candidate, an existing process graph associated with an existing process table satisfying a predetermined content similarity threshold value for the query table, from among the set of existing process tables; and a results management unit that determines search results data for the query data among the first search candidate and the second search candidate.

7 Claims, 12 Drawing Sheets

*FIG. 6*

PROCESS DB 231

| PROCESS ID (611) | PROCESS ORDER (612) | PROCESS NAME (613) |
|---|---|---|

EXISTING INFORMATION DB 232

EXISTING PROCESS GRAPH DB 620

| GRAPH ID (621) | NODE ID (622) | EDGE ID (623) | START POINT NODE ID (624) | END POINT NODE ID (625) |
|---|---|---|---|---|

EXISTING PROCESS TABLE DB 630

| NODE ID (631) | TABLE ID (632) | COLUMN (633) |
|---|---|---|

GRAPH SIMILARITY INFORMATION DB 233

| PROCESS ID (641) | EXISTING PROCESS GRAPH ID (642) || QUERY GRAPH ID (643) || SIMILARITY (644) |
|---|---|---|---|---|---|
| | GRAPH 1 | GRAPH k | GRAPH 1 | GRAPH n | |

SEARCH RESULTS DB 234

| GRAPH ID (651) | QUERY GRAPH ID (652) | MAXIMUM SIMILARITY (653) | SELECTED GRAPH (654) |
|---|---|---|---|

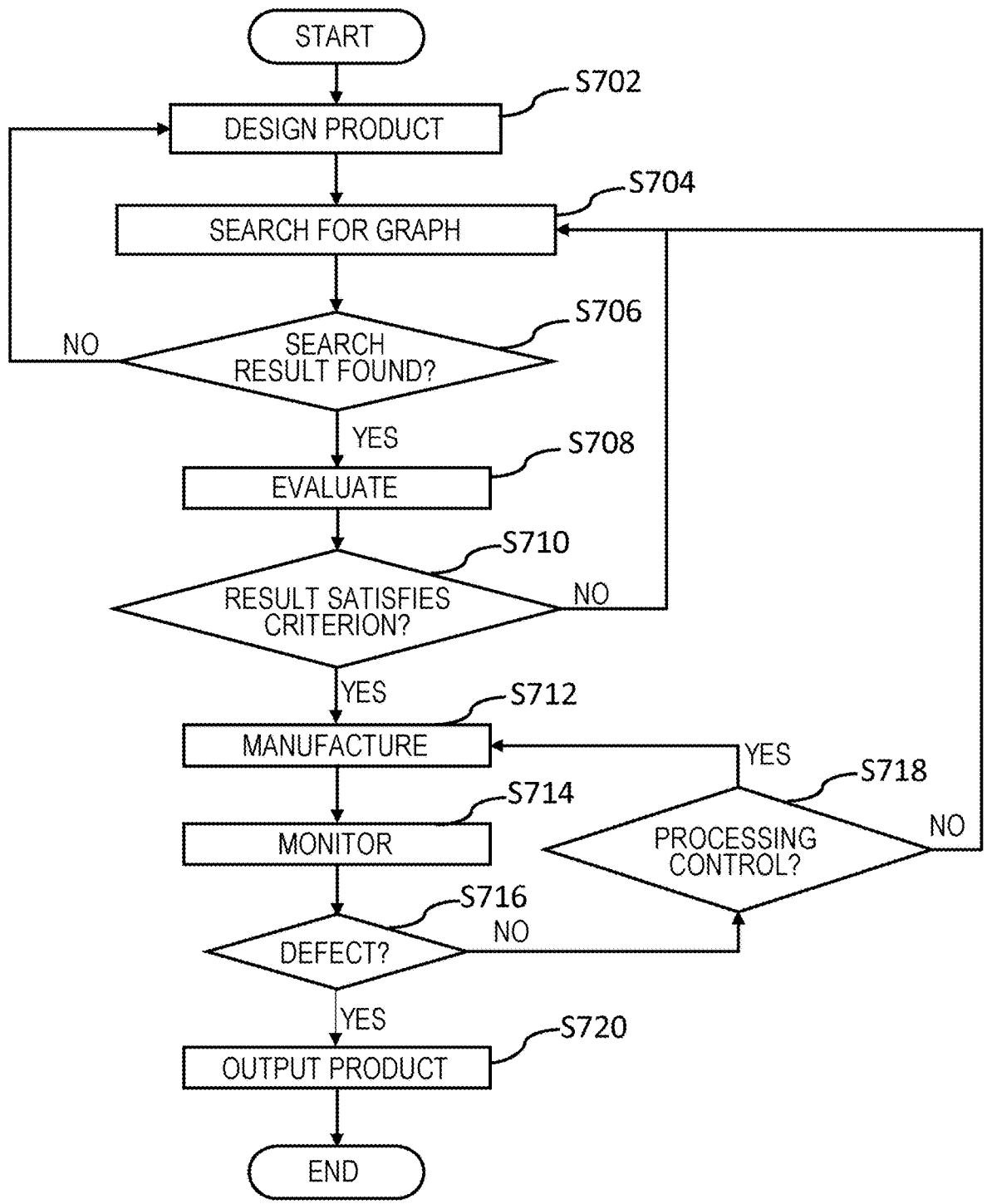

FIG. 12

SEARCH RESULTS CONFIRMATION SCREEN G02

SIMILARITY COMPARISON RESULTS TABLE 1210

| GRAPH ID | NODE ID | STRUCTURAL SIMILARITY | CONTENT SIMILARITY | TABLE ID |
|---|---|---|---|---|
| Graph1 | Node 1,2,3 | 90% | 80% | Table 1,2,3 |
| Graph2 | Node 4,5,6 | 90% | 80% | Table 4,5,6 |
| Graph4 | Node 8,9,10 | 85% | 75% | Table 8,9,10 |
| Graph5 | Node 15,16,18 | 85% | 75% | Table 15,16,18 |

SEARCH RESULTS DATA TABLE 1220

GRAPH ID  GRAPH 1

| NODE ID | TABLE ID | COLUMN NAME 1 | COLUMN NAME 2 | ... |
|---|---|---|---|---|
| Node1 | Table 1 | Sample ID | Recorded Time | Operator Name |
| Node2 | Table 2 | Material Name1 | Material Name2 | Material Name3 |
| Node3 | Table 3 | Machine Name | Operating Parameter | Operation Result |

GRAPH SEARCH DEVICE, GRAPH SEARCH SYSTEM, AND GRAPH SEARCH METHOD

CROSS-REFERENCE TO RELATED APPLICATIONS

The present application claims priority to Japanese Patent Application No. 2022-200881, filed Dec. 16, 2022. The contents of this application are incorporated herein by reference in their entirety.

BACKGROUND OF THE INVENTION

The present invention relates to a graph search device, a graph search system, and a graph search method.

SUMMARY OF THE INVENTION

In the manufacturing industry, products are manufactured using a process that includes various manufacturing steps. As an example, a chemical manufactured in a chemical plant may be manufactured using a process that includes manufacturing steps such as, for example, processing, hybridization, and heating of raw materials.

Graphical representations are useful tools for visualizing and managing such a process. In a graphical representation of a product, each step of manufacturing the product can be represented as a series of connected nodes. Such a graphical representation may also be associated with a table storing information relating to each node in the graph.

By using the above-described graph and table to manage product manufacturing steps, it is possible to easily grasp the overall flow of the manufacturing steps of various products, and information regarding each process of the manufacturing steps. Furthermore, by analyzing such a graph, it is possible to obtain new insights regarding the relationships between the nodes in the graph.

As one such means for analyzing a graph, there exists US 2022/0247662 A, for example.

US 2022/0247662 A discloses the following technology: "Technology for determining a prediction from a network dataset graph is disclosed. A graph of a network dataset may include nodes representing entities and edges representing connections or links between the entities. Predictions can be made using a dual path convolutional network that considers both node connectivity and node topology. For nodes present in different parts of the graph, the node topology also includes an evaluation of the similarity of topology roles between the nodes in the graph. By using a multi-head attention network, node connectivity and node topology in dual path convolution can be integrated. An output from a previous layer of the multi-head attention network may be provided as an input to a subsequent dual-path convolution layer in order to mutually enhance convolution in which node connectivity and node topology are determined, for the purpose of integration.".

In the aforementioned manufacturing industry, it may be desirable to refer to the manufacturing process of an existing product when designing the manufacturing process for a new product. If an existing product having a similar manufacturing process to that of the new product being designed can be specified, the design of the manufacturing process of the new product can be advanced efficiently by using the manufacturing process of the existing product.

For this reason, means for searching for the manufacturing processes of existing products stored in graph format, for example, is required.

US 2022/0247662 A relates to making predictions on the basis of a network dataset graph relating to computer-implementation services. As an example, in a case where a graph illustrates a relationship between a buyer and a seller having a business relationship, it is possible to predict a high risk of revenue loss for the seller by using the graph analysis means disclosed in US 2022/0247662 A. In addition, graph similarity is evaluated using the graph analysis method disclosed in US 2022/0247662 A.

In order to calculate the graph similarity highly accurately, it is desirable to consider various graph-related features. However, in the graph analysis method disclosed in US 2022/0247662 A, graph similarity that takes into account connectivity between the nodes in a graph and graph topology (structure) is used, but a graph search that takes into account the similarity of information relating to each node in the graph (for example, table information stored in a table associated with the graph) is not assumed.

For this reason, for a highly complex graph associated with various types of information regarding a product manufacturing process, for example, the accuracy of the graph analysis or graph similarity methods disclosed in US 2022/0247662 A is limited, and there is a possibility that a reliable search result will not be obtained.

Therefore, an object of the present disclosure is to provide a high-accuracy graph search means capable of providing a reliable search result by using a similarity comparison that takes into account table information stored in a table associated with a graph, in addition to the structure of the graph.

In order to solve the above problem, one representative example of the graph search device of the present invention includes: a processor; a memory; and a storage unit, in which the storage unit includes an existing information database storing existing information that includes a set of existing process graphs indicating the flow of a process in graph format and a set of existing process tables associated with the set of existing process graphs and storing information regarding the set of existing process graphs in table format, and the memory includes processing instructions for causing the processor to function as: a query data management unit that acquires query data that is a search query for the existing information and that includes a query graph and a query table; a structure comparison unit that compares the query graph included in the query data with the set of existing process graphs to calculate a structural similarity between the query graph and the set of existing process graphs, and determines, as a first search candidate, an existing process graph satisfying a predetermined structural similarity threshold value with respect to the query graph from among the set of existing process graphs; a content comparison unit that compares the query table included in the query data with the set of existing process tables to calculate a content similarity between the query graph and the set of existing process tables, and determines, as a second search candidate, an existing process graph associated with an existing process table satisfying a predetermined content similarity threshold value for the query table, from among the set of existing process tables; and a results management unit that determines search results data for the query data among the first search candidate and the second search candidate on the basis of a predetermined comprehensive evaluation criterion, and outputs the search results data.

According to the present disclosure, it is possible to provide a high-accuracy graph search means capable of providing a reliable search result by using a similarity comparison that takes into account table information stored in a table associated with a graph, in addition to the structure of the graph.

Problems, configurations, and advantageous effects other than those described above will be clarified by the following description of embodiments for carrying out the invention.

BRIEF DESCRIPTION OF THE DRAWINGS

FIG. 6 is a diagram illustrating an example of various databases stored in a storage unit according to the embodiment of the present disclosure;

FIG. 7 is a diagram illustrating an example of the overall flow of manufacturing processing in which the graph search means according to the embodiment of the present disclosure is used;

FIG. 12 is a diagram illustrating an example of a search results confirmation screen according to the embodiment of the present disclosure.

DETAILED DESCRIPTION

Figure 1:
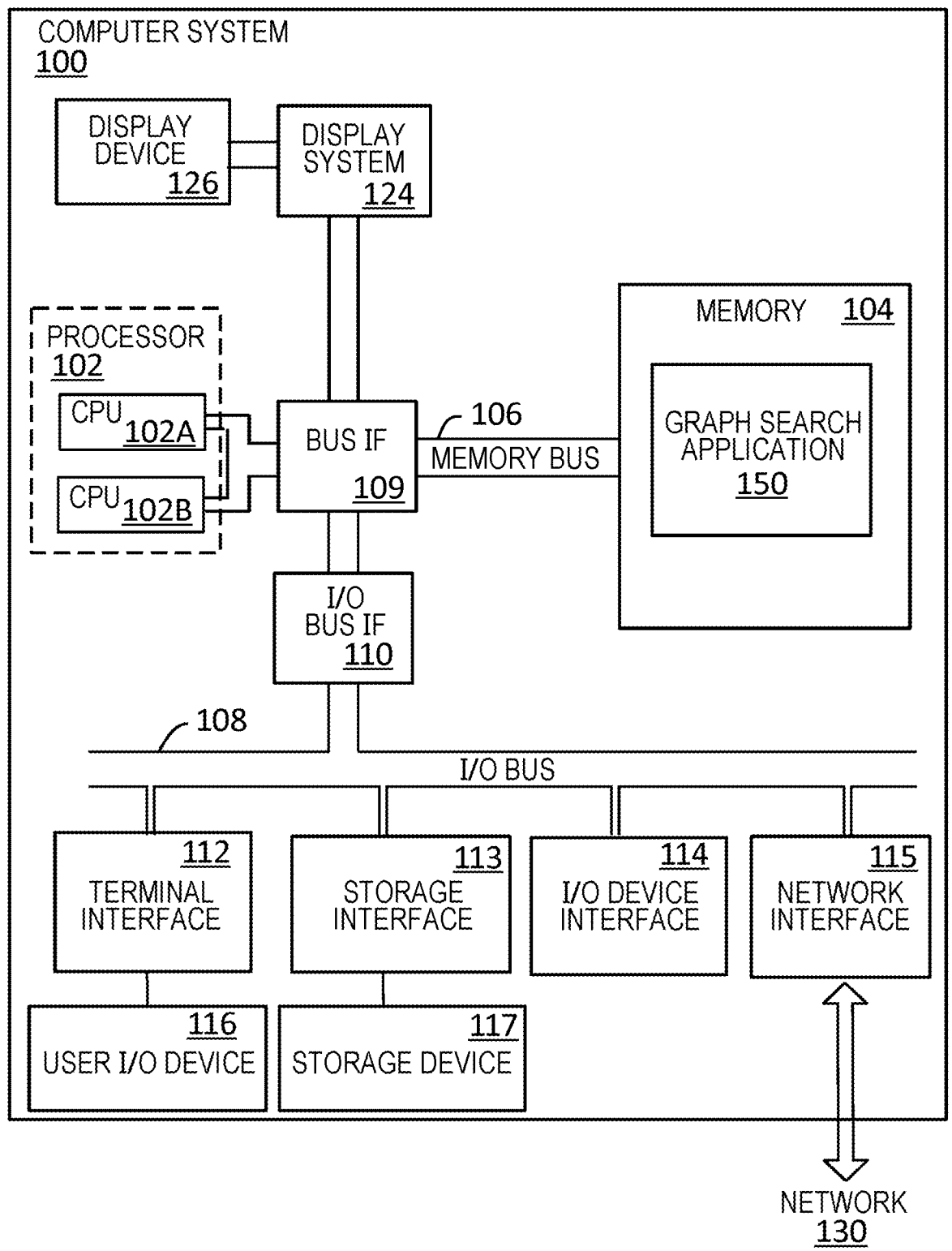
FIG. 1 is a diagram illustrating a computer system for carrying out an embodiment of the present disclosure.

An embodiment of the present invention will be described hereinbelow with reference to the drawings. Note that the present invention is not limited to or by this embodiment. In the drawings, the same parts are denoted by the same reference signs.

It will also be understood that although the terms "first," "second," "third," and so forth are sometimes used in the present disclosure to describe various elements or constituent elements, these elements or constituent elements should not be limited by these terms. These terms are only used to distinguish one element or constituent element from another element or constituent element. Thus, a first element or constituent element discussed below may also be referred to as a second element or constituent element without departing from the teachings of the inventive concepts.

First, a computer system 100 for carrying out the embodiment of the present disclosure will be described with reference to FIG. 1. The mechanisms and devices of the various embodiments disclosed herein may be applied to any suitable computing system. The main components of the computer system 100 include one or more processors 102, a memory 104, a terminal interface 112, a storage interface 113, an I/O (input/output) device interface 114, and a network interface 115. These components may be interconnected via a memory bus 106, an I/O bus 108, a bus interface unit 109, and an I/O bus interface unit 110.

The computer system 100 may include one or more general purpose programmable central processing units (CPU) 102A and 102B, which are collectively referred to as the processors 102. In a certain embodiment, the computer system 100 may include multiple processors, and in another embodiment, the computer system 100 may be a single CPU system. Each processor 102 executes instructions stored in memory 104 and may include an on-board cache.

In a certain embodiment, the memory 104 may include a random access semiconductor memory, a storage device, or a storage medium (either volatile or non-volatile) for storing data and programs. The memory 104 may store all or part of programs, modules, and data structures for implementing the functions described herein. For example, the memory 104 may store a graph search application 150. In a certain embodiment, the graph search application 150 may include instructions or descriptors for executing functions (described below) on the processor 102.

In a certain embodiment, the graph search application 150 may be implemented using hardware via semiconductor devices, chips, logic gates, circuits, circuit cards, and/or other physical hardware devices instead of a processor-based system or in addition to a processor-based system. In a certain embodiment, the graph search application 150 may include data other than instructions or descriptors. In a certain embodiment, a camera, sensor, or other data input device (not shown) may be provided to communicate directly with the bus interface unit 109, the processor 102, or other hardware of the computer system 100.

The computer system 100 may include a bus interface unit 109 that performs communications between the processor 102, the memory 104, the display system 124, and the I/O bus interface unit 110. The I/O bus interface unit 110 may be coupled to an I/O bus 108 for transferring data to and from various I/O units. The I/O bus interface unit 110 may communicate with a plurality of I/O interface units 112, 113, 114 and 115, also known as I/O processors (IOP) or I/O adapters (IOA), via an I/O bus 108.

The display system 124 may include a display controller, a display memory, or both. The display controller may provide video data, audio data, or both video and audio data to a display device 126. The computer system 100 may also include devices, such as one or more sensors, configured to collect data and provide the data to the processor 102.

For example, the computer system 100 may include a biometric sensor that collects heart data such as rate data and stress level data, an environment sensor that collects data such as humidity data, temperature data, and pressure data, a motion sensor that collects data such as acceleration data and motion data, and the like. Other types of sensors can also be used. The display system 124 may be connected to a display device 126 such as a single display screen, a television, a tablet, or a portable device.

The I/O interface unit has a function for communicating with various storage or I/O devices. For example, the terminal interface unit 112 enables attachment of a user I/O device 116 such as a user output device, for example a video display device or a speaker television, or a user input device, for example a keyboard, a mouse, a keypad, a touchpad, a trackball, a button, a light pen, or another pointing device.

The user may use the user interface to operate a user input device to input input data and instructions to the user I/O device 116 and the computer system 100 and to receive output data from the computer system 100. The user interface may, for example, be displayed on a display device, reproduced by a loudspeaker, or printed via a printer, via the user I/O device 116.

One or more disk drives or direct access storage devices 117 (typically magnetic disk drive storage devices, but may also be a disk drive array configured to appear as a single disk drive, or other storage devices) can be attached to the storage interface 113. In a certain embodiment, the storage device 117 may be implemented as any secondary storage device. The contents of the memory 104 may be stored in the storage device 117 and read from the storage device 117 as necessary. The I/O device interface 114 may provide an interface for other I/O devices, such as printers, fax machines, and the like. The network interface 115 may provide a communication path so as to enable the computer system 100 and other devices to communicate with each other. This communication path may be, for example, the network 130.

In a certain embodiment, the computer system 100 may be a device that receives requests from other computer systems (clients) that do not have a direct user interface, such as a multi-user mainframe computer system, a single-user system, or a server computer. In other embodiments, the computer system 100 may be a desktop computer, a portable computer, a notebook computer, a tablet computer, a pocket computer, a telephone, a smartphone, or any other suitable electronic device.

Next, a graph search system according to the embodiment of the present disclosure will be described with reference to FIG. 2.

Figure 2:
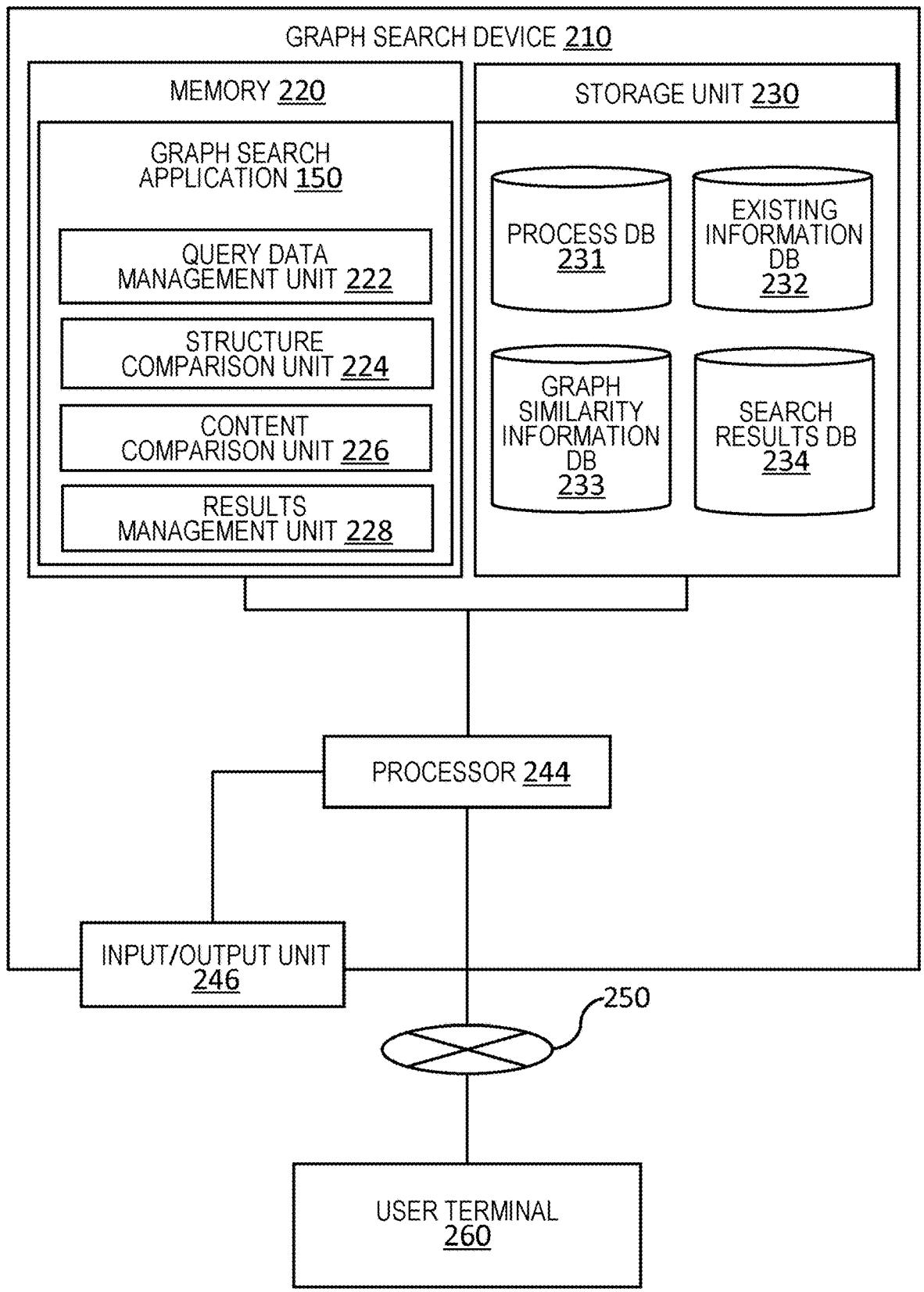
FIG. 2 is a diagram illustrating an example of a configuration of a graph search system according to the embodiment of the present disclosure.

FIG. 2 is a diagram illustrating an example of a configuration of a graph search system 200 according to the embodiment of the present disclosure. The graph search system 200 is a system for searching for a graph which is highly similar to a predetermined process represented in graph format, and for providing the graph to the user. As illustrated in FIG. 2, the graph search system 200 includes graph search device 210, a communication network 250, and a user terminal 260. In the graph search system 200, the graph search device 210 and the user terminal 260 may be connected to each other via the communication network 250.

The graph search device 210 is a device that searches for a graph corresponding to a process which is highly similar to a predetermined process represented in graph format, and mainly includes a memory 220, a storage unit 230, a processor 244, and an input/output unit 246, as illustrated in FIG. 2.

In a certain embodiment, the graph search device 210 may be implemented by the computer system 100 illustrated in FIG. 1.

The memory 220 may be a memory for storing the graph search application 150 for implementing the function of the graph search means according to the embodiment of the present disclosure. As illustrated in FIG. 2, the graph search application 150 may include processing instructions for implementing functions of software modules such as a query data management unit 222, a structure comparison unit 224, a content comparison unit 226, and a results management unit 228.

The query data management unit 222 is a functional unit for acquiring and managing query data indicating a search query for existing information stored in an existing information database 232 (described below). The query data may be information for searching for a graph which is highly similar to a predetermined process represented in graph format, or may be inputted by the user via the user terminal 260 described below. Furthermore, the query data may include a query graph illustrating a predetermined process in graph format, and a query table illustrating, in table format, information regarding the query graph.

The structure comparison unit 224 is a functional unit for calculating structural similarity between the query graph included in the query data acquired by the query data management unit 222 and a set of existing process graphs included in existing information stored in the existing information database 232 (described below). In the present disclosure, "structural similarity" means similarity that takes into account structural features such as the positions of nodes constituting a graph, the connective relationships between the nodes, and paths in the graph. In a certain embodiment, the structural similarity of the present disclosure may be calculated using a predetermined graph analysis method or predetermined natural language processing.

The content comparison unit 226 is a functional unit for calculating content similarity between a query table included in the query data acquired by the query data management unit 222 and a set of existing process tables included in existing information stored in the existing information database 232 (described below). In the present disclosure, "content similarity" means similarity that takes into account syntactic and semantic features of table information storing graph-related information in table format. In a certain embodiment, the content similarity of the present disclosure may be calculated using predetermined natural language processing.

The results management unit 228 is a functional unit that determines search results data for query data acquired by the query data management unit 222 on the basis of the similarity comparisons by the structure comparison unit 224 and the content comparison unit 226 described above. In a certain embodiment, the results management unit 228 may determine the search results data by evaluating search candidates determined by the structure comparison unit 224 and the content comparison unit 226, on the basis of a predetermined comprehensive evaluation criterion.

The storage unit 230 is a storage area that stores a database (hereinafter, "DB") for storing various types of information according to the embodiment of the present disclosure, and may include a process DB 231, an existing information DB 232, a graph similarity information DB 233, and a search results DB 234, as illustrated in FIG. 2.

The process DB 231 is a database that stores information regarding existing processes.

The existing information DB 232 is a database that stores existing information to be searched on the basis of query data, and includes an existing process graph DB 620 and an existing process table DB 630 as described below.

The graph similarity information DB 233 is a database that stores information regarding similarity comparisons (structural similarity and content similarity) according to the embodiment of the present disclosure.

The search results DB 234 is a database that stores information regarding search results for the query data.

The processor 244 is a processing unit for executing processing instructions that define the functions of each functional unit of the graph search application 150 stored by the memory 220.

The input/output unit 246 is a functional unit that receives information inputted to the graph search device 210 and for outputting information such as search results data generated by the graph search device 210. In a certain embodiment, the input/output unit 246 may display a query data settings screen G01 that receives, from the user, information for setting the query data, and a search results data confirmation screen G02 that displays search results data for the query data via the user terminal 260. Furthermore, in a certain embodiment, the input/output unit 246 may include, for example, a keyboard, a mouse, a display that displays a graphical user interface (GUI), and the like.

The communication network 250 may include, for example, a local area network (LAN), a wide area network (WAN), a satellite network, a cable network, a WiFi network, or any combination thereof.

The user terminal 260 is a terminal device that can be used by the user of the graph search device 210. By using the user terminal 260, the user is able to ask the graph search device 210 to perform a graph search by using the GUI provided by the input/output unit 246 to input query data, for example, and is able to confirm the search results data outputted from the graph search device 210. As an example, the user terminal 260 may include, for example, a smartphone, a smart watch, a tablet, a personal computer, and the like, and is not particularly limited.

Note that, in FIG. 2, for expediency in the description, a configuration including one user terminal 260 is described as an example, but the number of user terminals 260 is not particularly limited.

With the graph search system 200 described hereinabove, it is possible to provide a high-accuracy graph search means capable of providing a reliable search result by using a similarity comparison that takes into account table information stored in a table associated with a graph, in addition to the structure of the graph.

Next, an example of a process according to the embodiment of the present disclosure will be described with reference to FIG. 3.

Figure 3:
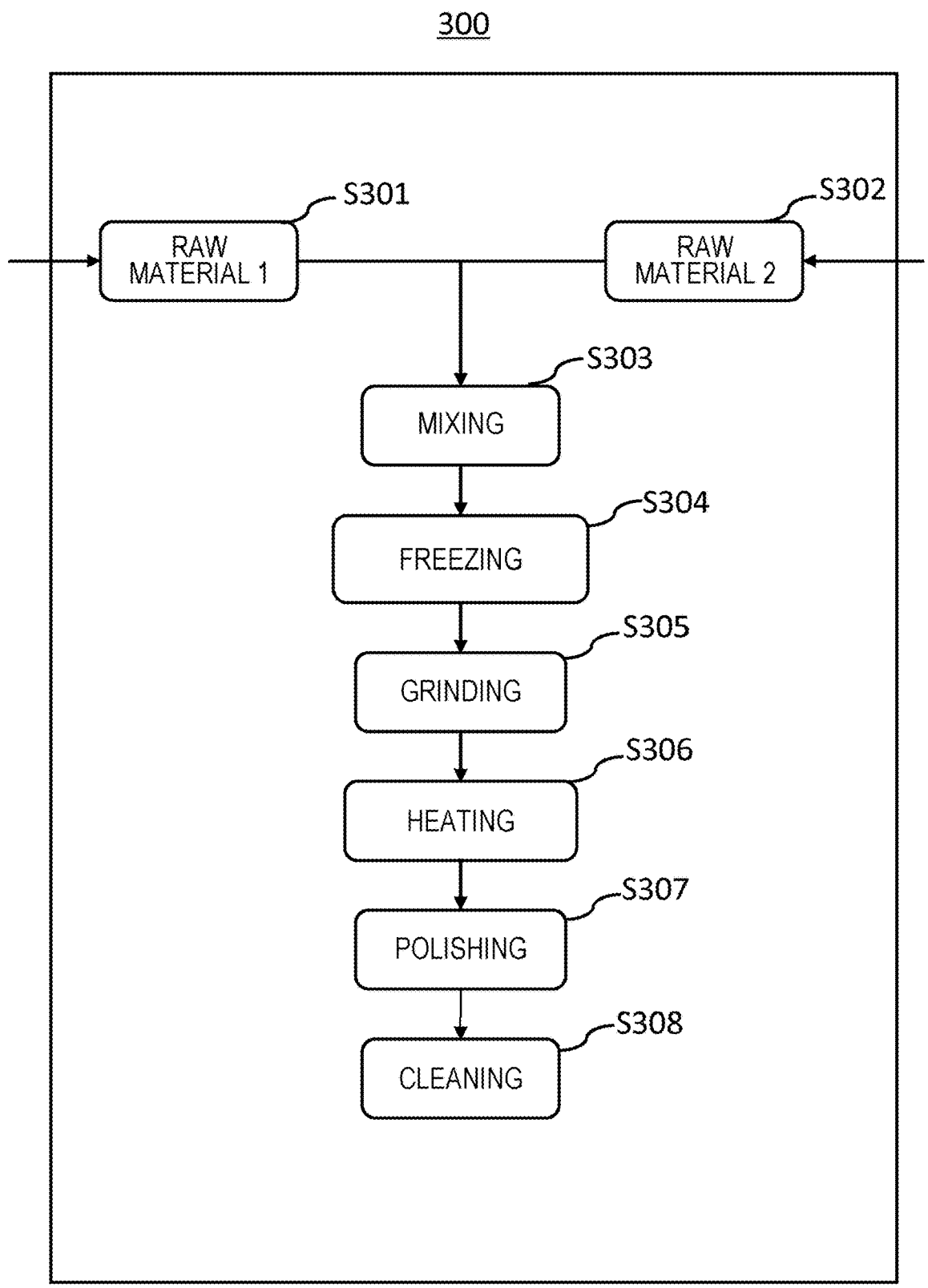
FIG. 3 is a diagram illustrating an example of a manufacturing process according to the embodiment of the present disclosure.

FIG. 3 is a diagram illustrating an example of a manufacturing process 300 according to the embodiment of the present disclosure. As described above, in the manufacturing industry, for example, products are manufactured using a process that includes various manufacturing steps. In the present disclosure, a "process" means a process including a series of steps.

FIG. 3 illustrates the manufacturing process 300, which is for a chemical manufactured in a chemical plant, for example, as an example of a process according to the embodiment of the present disclosure. As illustrated in FIG. 3, the manufacturing process 300 includes step S301 of acquiring a first raw material, step S302 of acquiring a second raw material, step S303 of mixing the first raw material and the second raw material, step S304 of freezing the output of step S303, step S305 of grinding the output of step S304, step S306 of heating the output of step S305, step S307 of polishing the output of step S306, and step S308 of cleaning the output of step S307.

As noted above, a process such as the manufacturing process 300 illustrated in FIG. 3 may be represented in graph format. In this case, each of the steps constituting the manufacturing process 300, such as acquisition of the raw material, and hybridization, freezing, grinding, heating, polishing, and cleaning of the raw material can be represented as a connected node. Furthermore, the nodes representing each of these steps may be associated with a table that stores information regarding the steps. For example, the step of "freezing" may be associated with a table that stores information such as the temperature used in the freezing processing and the time until freezing.

In FIG. 3, for example, a manufacturing process 300 for a chemical manufactured in a chemical plant is illustrated as an example, but the present disclosure is not limited thereto, rather, the graph search means according to the embodiment of the present disclosure may be appropriately applied to any industry or field.

Next, a graph and a table according to the embodiment of the present disclosure will be described with reference to FIG. 4.

As described above, one aspect of the present disclosure relates to retrieving a graph having a high degree of similarity to a predetermined process represented in graph format. More specifically, the graph search device 210 according to the embodiment of the present disclosure uses query data indicating a user search query to search an existing information database storing existing information that includes a set of existing process graphs indicating the flow of an existing process in graph format and a set of existing process tables associated with the existing process graphs and storing information regarding the set of existing process graphs in table format, and determines search results data for the query data.

Figure 4:
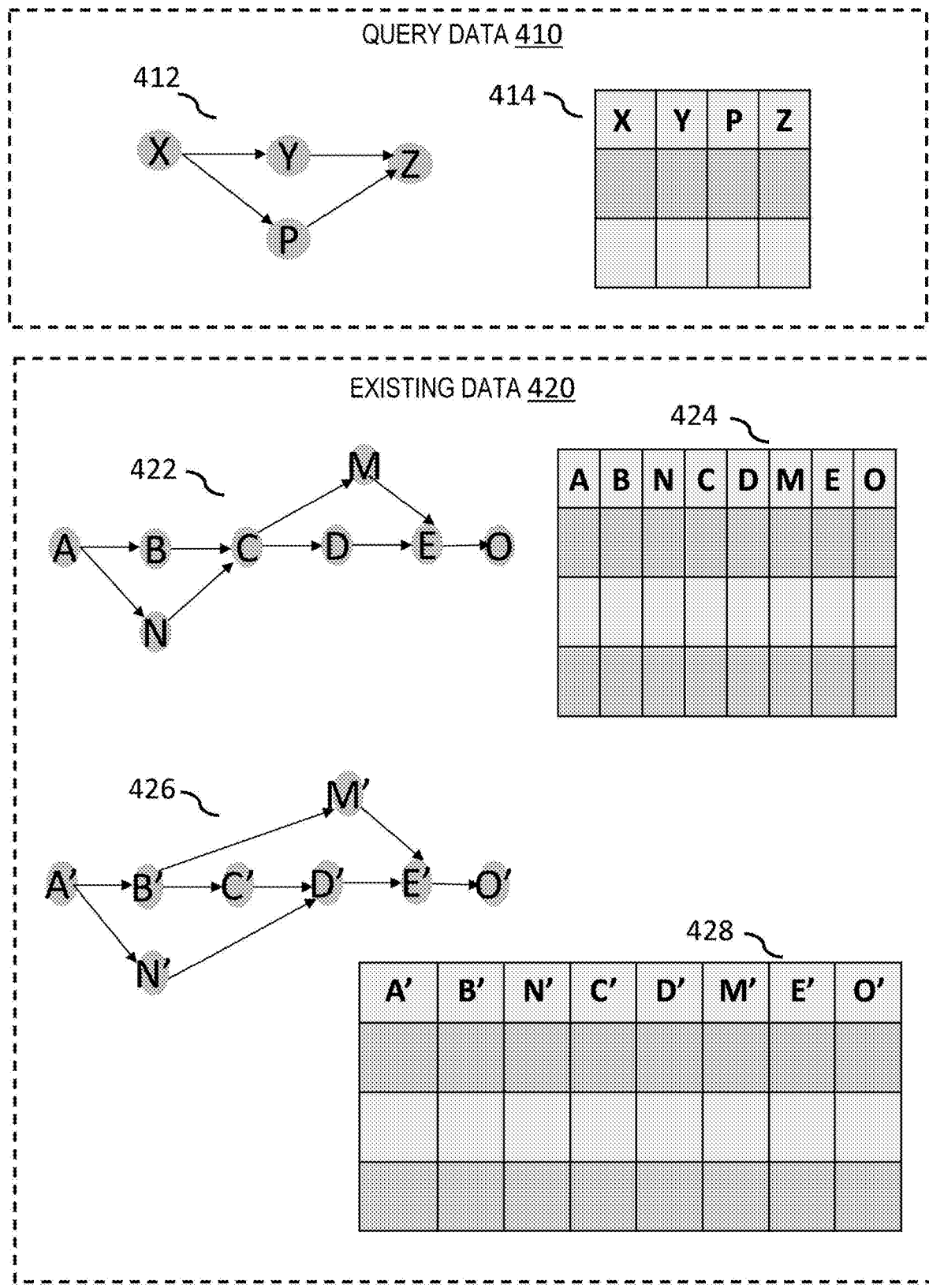
FIG. 4 is a diagram illustrating an example of query data and existing information according to the embodiment of the present disclosure.

FIG. 4 is a diagram illustrating an example of query data 410 and existing information 420 according to the embodiment of the present disclosure.

The query data 410 is information indicating user search queries and may include a query graph 412 indicating a predetermined process in graph format, and a query table 414 indicating information regarding the query graph 412 in table format. In a certain embodiment, a user (for example, a user of the user terminal 260 or the like) may use a query data settings screen G01 (described below) to set the query data 410 by defining the query graph 412 and the query table 414.

The existing information 420 is information for which a search is performed on the basis of the query data 410, and may include a set of existing process graphs including a first existing process graph 422 and a second existing process graph 426 that indicate the flow of an existing process in graph format, and a set of existing process tables including a first existing process table 424 and a second existing process table 428 that store, in table format, information regarding the first existing process graph 422 and the second existing process graph 426, respectively.

As illustrated in FIG. 4, each of the query graph 412, the first existing process graph 422, and the second existing process graph 426 includes a plurality of connected nodes (X, Y, Z, and A, B, C, and so forth). Each node includes node name information indicating the name of the node. In addition, the query table 414, the first existing process table 424, and the second existing process table 428 store, in one or a plurality of columns, information in table format regarding each node in the query graph 412, the first existing process graph 422, and the second existing process graph 426.

The columns stored in each of the first existing process table 424 and the second existing process table 428 include column name information indicating the names of the columns and table information stored in the columns.

Note that, for expediency in the description, in FIG. 4, a case where the first existing process table 424 and the second existing process table 428 include one column for each node in the first existing process graph 422 and the second existing process graph 426 is described as an example. However, the present disclosure is not limited thereto, and in practice, the first existing process table 424 and the second existing process table 428 may store a plurality of columns for each node in the first existing process graph 422 and the second existing process graph 426.

As will be described below, the graph search device according to the embodiment of the present disclosure calculates structural similarity between the query graph 412 and a set of existing process graphs including the first existing process graph 422 and the second existing process graph 426, and calculates content similarity between the query table 414 and a set of existing process tables including the first existing process table 424 and the second existing process table 428, and thus search results data for the query data 410 can be determined on the basis of the calculated structural similarity and content similarity.

Next, the correspondence relationship between a graph and a table according to the embodiment of the present disclosure will be described with reference to FIG. 5.

Figure 5:
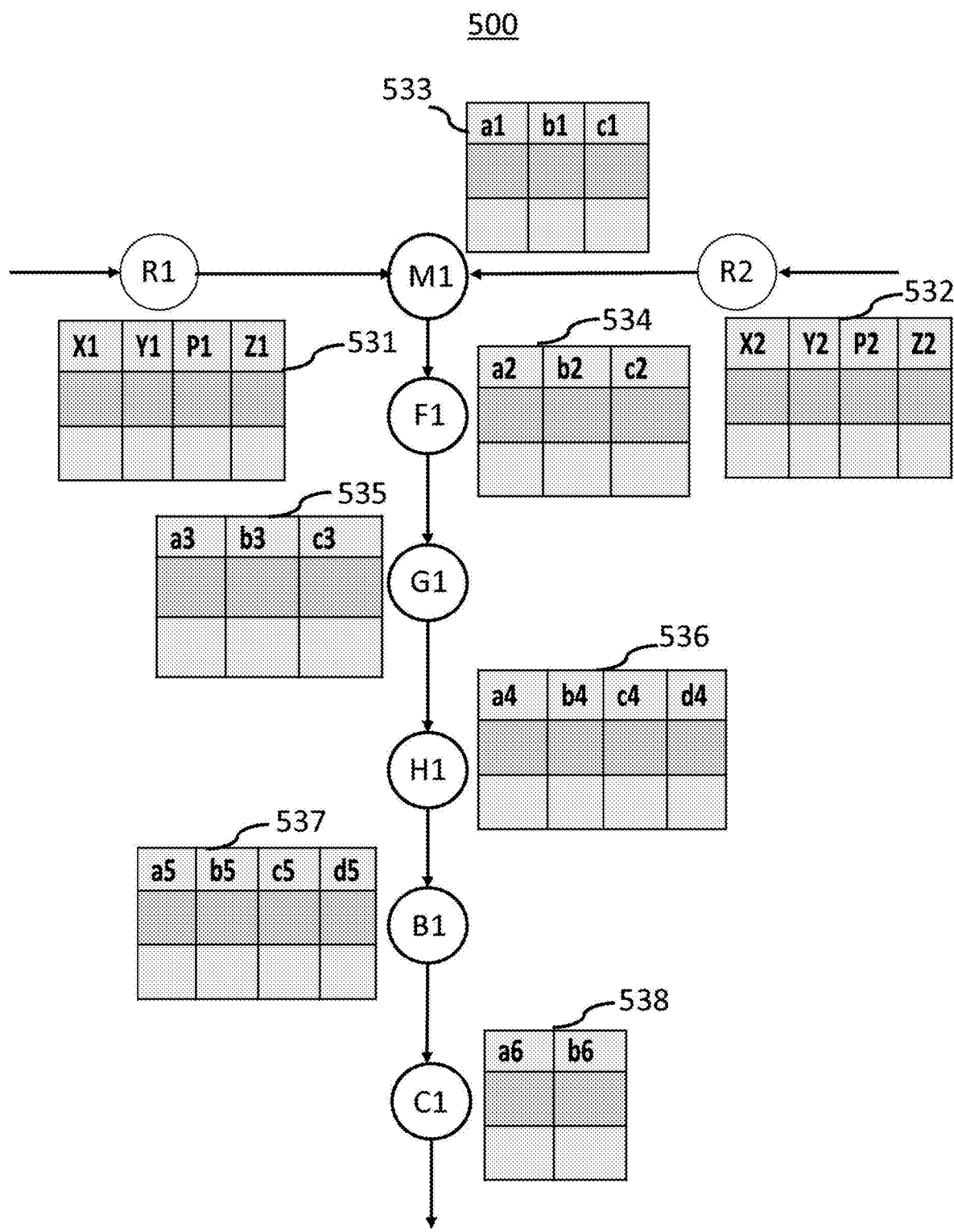
FIG. 5 is a diagram illustrating a correspondence relationship between a graph and a table according to the embodiment of the present disclosure.

FIG. 5 is a diagram illustrating a correspondence relationship between a graph and a table according to the embodiment of the present disclosure. As described above, a process graph (for example, a manufacturing process for manufacturing a product, or the like) may include a plurality of nodes representing steps in a process, and each node may be associated with a process table that stores information regarding the node.

For example, as illustrated in FIG. 5, the predetermined process graph 500 includes a node R1, a node R2, a node M1, a node F1, a node G1, a node H1, a node B1, and a node C1. In this case, the node R1 may be associated with the process table 531, the node R2 may be associated with the process table 532, the node M1 may be associated with the process table 533, the node F1 may be associated with the process table 534, the node G1 may be associated with the process table 535, the node H1 may be associated with the process table 536, the node B1 may be associated with the process table 537, and the node C1 may be associated with the process table 538. In the present disclosure, "R1, R2, M1" and so forth, which indicate the names of the nodes, are referred to as the "node names", and each column in the process table associated with each node is referred to as the "column name".

Next, various databases stored in the storage unit according to the embodiment of the present disclosure will be described with reference to FIG. 6.

FIG. 6 is a diagram illustrating an example of various databases stored in a storage unit 230 according to the embodiment of the present disclosure. As illustrated in FIG. 6, the storage unit 230 according to the embodiment of the present disclosure may include a process DB 231, an existing information DB 232, a query graph DB 233, a graph similarity information DB 233, and a search results DB 234.

The process DB 231 is a database for storing information regarding existing processes, and may include information such as a process ID 611 identifying a specific process, a process order 612 indicating the order of steps constituting the process, and a process name 613 indicating the name of the process.

The existing information DB 232 is a database that stores existing information for which a search has been performed on the basis of query data, and includes an existing process graph DB 620 that stores an existing process graph and an existing process table DB 630 that stores information regarding the existing process graph in table format.

The existing process graph DB 620 is a database that stores an existing process graph, and may include information such as a graph ID 621 identifying a specific existing process graph, a node ID 622 identifying each node in the graph, an edge ID 623 identifying each edge connecting nodes in the graph, a start point node ID 624 identifying a start point node in the graph, and an end point node ID 625 identifying an end point node in the graph.

The existing process table DB 630 is an existing process table that stores, in table format, information regarding an existing process graph stored in the existing process graph DB 620, and may include information such as a node ID 631 identifying a specific node in a specific existing process graph, a table ID 632 identifying a table associated with the node, and a column 633 included in the table.

The graph similarity information DB 233 is a database that stores information regarding similarity comparison (structural similarity or content similarity) according to an embodiment of the present disclosure, and may include a process ID 651 identifying a predetermined process (for example, a process stored in the process DB 231), an existing process graph ID 642 identifying a specific existing process graph used for comparison, a query graph ID 643 identifying a specific query graph used for comparison, and a similarity 644 indicating similarity between the existing process graph and the query graph. The similarity 644 may indicate the structural similarity of the compared graphs and the content similarity of tables associated with the graphs.

The search results DB 234 is a database that stores information regarding search results for the query data, and may include information such as an existing process graph ID 651 that identifies a specific existing process graph to be used for comparison, a query graph ID 652 that identifies a specific query graph to be used for comparison, a maximum similarity (for example, the highest similarity among the structural similarity and content similarity) 653 of these graphs, and selected graph 654 indicating a process graph selected as a search result (an existing process graph selected as a search result).

Next, an overall flow of manufacturing processing using the graph search means according to the embodiment of the present disclosure will be described with reference to FIG. 7.

As described above, in the manufacturing industry, it may be desirable to refer to the manufacturing process of an existing product when designing the manufacturing process for a new product. If an existing product having a similar manufacturing process to that of the new product being designed can be specified, the design of the new product and of the manufacturing process of the new product can be advanced efficiently by using the manufacturing process of the existing product. Accordingly, an aspect of the present disclosure relates to a graph search means for accurately identifying a graph corresponding to a manufacturing process of an existing product similar in terms of the manufacturing process to a new product being designed.

FIG. 7 is a diagram illustrating an example of the overall flow of manufacturing processing 700 in which the graph search means according to the embodiment of the present disclosure is used.

First, in step S702, the manufacturer designs a new product. As an example, the manufacturer may design the product by defining the performance, function, mechanism, structure, and the like of the product and planning the material, shape, dimension, processing method, steps, and the like to be used. Here, the manufacturer may indicate some or all of the steps of the manufacturing process of the product in graph format or table format. In a certain embodiment, the manufacturer may transmit the provisional manufacturing process shown in graph format as query data from the user terminal illustrated in FIG. 2 to the graph search device 210.

Next, in step S704, the graph search device 210 according to the embodiment of the present disclosure performs the graph search processing according to the embodiment of the present disclosure on the basis of the query data received from the manufacturer in step S702, thereby determining the presence or absence of an existing process graph satisfying a predetermined similarity criterion with respect to the manufacturing process defined in the query data.

Note that details of the graph search processing according to the embodiment of the present disclosure will be described below with reference to FIG. 8, and thus a description thereof will be omitted here.

Next, in step S706, in a case where an existing process graph satisfying the predetermined similarity criterion for the manufacturing process defined in the query data is specified in step S704, the processing advances to step S708. On the other hand, in a case where an existing process graph satisfying the predetermined similarity criterion with respect to the manufacturing process defined in the query data is not specified in step S704, the processing returns to step S702, and the design of the product is adjusted.

Next, in step S708, the search result specified in step S704 is evaluated. Here, the manufacturer or the graph search device 210 determines whether or not the manufacturing process shown in the existing process graph included in the specified search result satisfies an efficiency criterion regarding the predetermined time, cost, or quality. This efficiency criterion may be determined based on, for example, product specifications or manufacturer requirements. In a certain embodiment, the evaluation may be performed by a predetermined simulation technique or a modeling technique.

Next, in step S710, in a case where it is determined that the search result specified in step S704 satisfies the efficiency criterion of the evaluation performed in step S708, the present processing advances to step S712. On the other hand, in a case where it is determined that the search result specified in step S704 does not satisfy the efficiency criterion of the evaluation performed in step S708, the processing returns to step S704, and the graph search is performed again.

Next, in step S712, the manufacturer manufactures a product on the basis of the existing process graph included in the search result determining that the efficiency criterion of the evaluation performed in step S708 is satisfied.

Next, in step S714, the manufacturer monitors the product manufactured in step S712 and performs a quality inspection.

Next, in step S716, the manufacturer determines whether there is a defect in the product as a result of the monitoring and quality inspection in step S714. In a case where it is determined that there is a defect in the product, the processing advances to step S718. In a case where it is determined that there is no defect in the product, the processing advances to step S720.

Next, in step S718, the manufacturer determines whether or not processing control for suppressing the occurrence of a defect is applicable to the product determined to have the defect. In a case where it is determined that the processing control for suppressing the occurrence of a defect is applicable, the manufacturer applies the processing control and restarts the manufacturing in step S712. On the other hand, in a case where it is determined that the processing control for suppressing the occurrence of the defect is inapplicable, the processing returns to step S704, and the graph search is performed again.

Next, in step S720, the manufacturer outputs the manufactured product.

With the manufacturing processing 700 described above, by using the graph search processing according to the embodiment of the present disclosure, an existing process graph corresponding to a manufacturing process of an existing product having a similar manufacturing process to the new product being designed is specified, and by using a process graph of an existing manufacturing process having a high degree of similarity, it is possible to efficiently proceed with the design of the new product and the manufacturing process therefor.

Next, graph search processing according to the embodiment of the present disclosure will be described with reference to FIG. 8.

Figure 8:
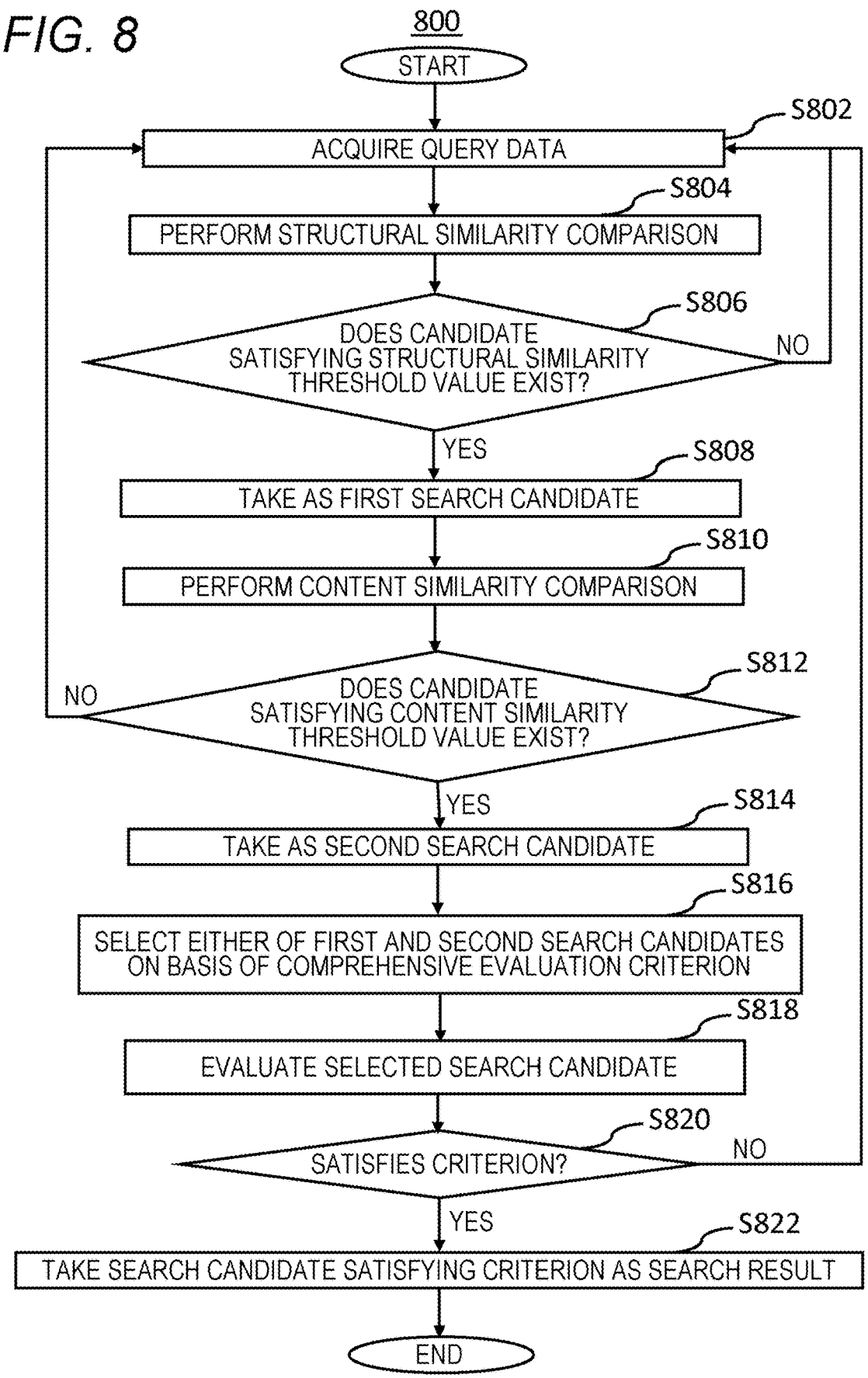
FIG. 8 is a diagram illustrating an example of the flow of graph search processing according to the embodiment of the present disclosure.

FIG. 8 is a diagram illustrating an example of the flow of graph search processing 800 according to the embodiment of the present disclosure. The graph search processing 800 according to the embodiment of the present disclosure is processing for searching for a graph which is highly similar to a predetermined process represented in graph format and providing the graph to the user, and is performed by each functional unit stored in the graph search device 210 illustrated in FIG. 2.

First, in step S802, the query data management unit 222 acquires query data indicating a search query for existing information stored in the aforementioned existing information database 232. As described above, the query data may be information for searching for a process graph which is highly similar to a predetermined process represented in graph format, or may be inputted by the user via the user terminal 260 (described below). Furthermore, the query data may include a query graph illustrating a predetermined process in graph format, and a query table associated with the query graph and illustrating, in table format, information regarding the query graph.

Next, in step S804, the structure comparison unit 224 calculates structural similarity between the query graph included in the query data acquired by the query data management unit 222 in step S802 and the set of existing process graphs stored in the existing process graph DB 620. The structure comparison unit 224 may store the structural similarity calculated here in the graph similarity information DB 233 described above.

Note that details of the processing to calculate the structural similarity will be described below with reference to FIG. 9, and thus a description thereof will be omitted here.

Next, in step S806, as a result of the structural similarity comparison in step S804, the structure comparison unit 224 determines whether or not an existing process graph satisfying a predetermined structural similarity threshold value with respect to the query graph included in the query data is present in the set of existing process graphs. In a case where the structure comparison unit 224 determines that there is an existing process graph satisfying a predetermined structural similarity threshold value with respect to the query graph included in the query data in the set of existing process graphs, the processing advances to step S808.

On the other hand, in a case where the structure comparison unit 224 determines that there is no existing process graph satisfying the predetermined structural similarity threshold value with respect to the query graph included in the query data in the set of existing process graphs, the processing returns to step S802, and the query data management unit 222 adjusts or re-acquires the query data.

Next, in step S808, the structure comparison unit 224 takes, as a first search candidate, an existing process graph which has been determined as satisfying a predetermined structural similarity threshold value with respect to the query graph included in the query data. Here, the "first search candidate" means an existing process graph having a high structural similarity (satisfying a structural similarity threshold value) to the query graph included in the query data, and is one of the search results candidates for the query data. Furthermore, the first search candidate here is not limited to one existing process graph, and may be a plurality of existing process graphs satisfying structural similarity to the query graph.

Next, in step S810, the content comparison unit 226 calculates content similarity between the query table included in the query data acquired by the query data management unit 222 in step S802 and the set of existing process tables stored in the existing process table DB 630. The content comparison unit 226 may store the content similarity calculated here in the graph similarity information DB 233 described above.

Note that details of the processing to calculate the content similarity will be described below with reference to FIG. 10, and thus a description thereof will be omitted here.

Next, in step S812, as a result of the content similarity comparison in step S810, the content comparison unit 226 determines whether or not an existing process table satisfying a predetermined content similarity threshold value with respect to the query table included in the query data is present in the set of existing process tables. In a case where the content comparison unit 226 determines that there is an existing process table satisfying the predetermined content similarity threshold value with respect to the query table included in the query data in the set of existing process graphs, the processing advances to step S814.

On the other hand, in a case where the content comparison unit 226 determines that there is no existing process table satisfying the predetermined content similarity threshold value with respect to the query table included in the query data in the set of existing process tables, the processing returns to step S802, and the query data management unit 222 adjusts or re-acquires the query data.

Next, in step S814, the content comparison unit 226 takes, as a second search candidate, an existing process graph associated with the existing process table that has been determined as satisfying the predetermined content similarity threshold value with respect to the query table included in the query data. Here, the "second search candidate" means an existing process graph associated with an existing process table having a high content similarity to the query table included in the query data, and is one of the search results candidates for the query data. Furthermore, the second search candidate here is not limited to one existing process graph, and may be a plurality of existing process graphs satisfying content similarity to the query graph.

Next, in step S816, the results management unit 228 selects a search candidate satisfying a predetermined comprehensive evaluation criterion from among the first search candidate determined by the structural similarity comparison and the second search result determined by the content similarity comparison. Here, the comprehensive evaluation criterion is information used to determine appropriateness with respect to search candidate query data. In a certain embodiment, the comprehensive evaluation criterion may define a predetermined similarity threshold value (for example, 70%, 80%). Further, in a certain embodiment, the comprehensive evaluation criterion may define "selecting search candidate having highest similarity to quest data among first search candidate and second search result". Furthermore, in a certain embodiment, the comprehensive evaluation criterion is "the search candidate having the highest average value for structural similarity and content similarity may be selected from among the first search candidate and the second search result".

Here, the results management unit 228 may select an arbitrary number of search candidates that satisfy the comprehensive evaluation criterion.

As an example, the results management unit 228 may refer to the above-described graph similarity information DB 233, compare the structural similarity calculated for the first search candidate with the content similarity calculated for the second search candidate, and select a search candidate (alternatively, the search candidate having the highest similarity) that satisfies the similarity threshold value defined in the comprehensive evaluation criterion.

Next, in step S818, the results management unit 228 evaluates the search candidate selected in step S816. Here, the results management unit 228 determines whether or not the process indicated by the existing processing graph included in the search candidate selected in step S816 satisfies the efficiency criterion regarding a predetermined time, cost, or quality. This efficiency criterion may be determined based on, for example, product specifications or manufacturer requirements. In a certain embodiment, the evaluation may be performed by a predetermined simulation technique or a modeling technique.

This step substantially corresponds to step S708 in the manufacturing processing 700 illustrated in FIG. 7.

Next, in step S820, in a case where it is determined that the search candidate evaluated in step S818 satisfies the above-described evaluation criterion (for example, the efficiency criterion described above), the present processing advances to step S822. On the other hand, in a case where it is determined that the search result evaluated in step S818 does not satisfy the above-described evaluation criterion (for example, the efficiency criterion described above), the processing returns to step S802, and the query data is adjusted or reacquired.

Next, in step S822, the results management unit 228 takes a search candidate which has been determined as satisfying the above-described evaluation criterion as search results data for the query data, and transmits the search results data to the user terminal 260 of the user who set the query data. Here, the results management unit 228 may output, as the search results data, the existing process graph which has been determined as satisfying the evaluation criterion and the process table associated with the existing process graph.

With the graph search processing 800 according to the embodiment of the present disclosure described above, it is possible to acquire a process graph corresponding to a process having high similarity to an arbitrary process represented in graph format. In the graph search processing 800 according to the embodiment of the present disclosure, the search is performed that takes into account content similarity based on table information stored in a table associated with each node in the graph, in addition to the structural similarity based on the node configuration of the graph, and hence a higher-accuracy existing process graph can be provided as the search result for the process defined in the query.

Next, structural similarity comparison processing according to the embodiment of the present disclosure will be described with reference to FIG. 9.

Figure 9:
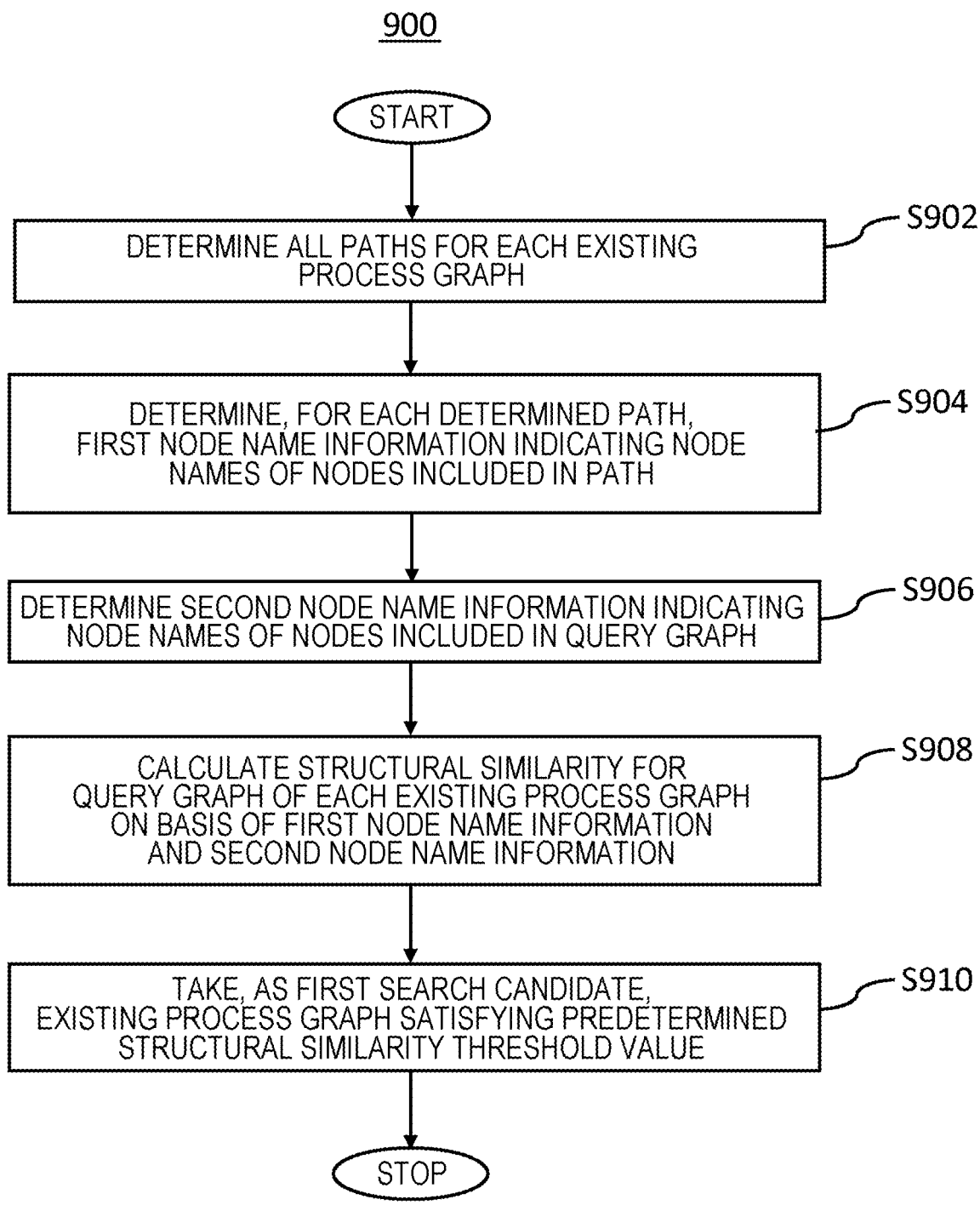
FIG. 9 is a diagram illustrating an example of the flow of structural similarity comparison processing according to the embodiment of the present disclosure.

FIG. 9 is a diagram illustrating an example of the flow of structural similarity comparison processing 900 according to the embodiment of the present disclosure. The structural similarity comparison processing 900 is processing for calculating structural similarity between the query graph included in the query data acquired from the user and each existing process graph included in the set of existing process graphs, and is performed by the structure comparison unit 224 of the graph search device 210 illustrated in FIG. 2.

As described above, "structural similarity" in the present disclosure means similarity that takes into account structural features such as the positions of nodes constituting a graph, the connective relationships between the nodes, and paths in the graph. As will be described below, in the structural similarity comparison processing 900, the structural similarity between the query graph and the existing process graphs is calculated on the basis of the natural language information regarding the nodes constituting each graph.

First, in step S902, the structure comparison unit 224 determines a set of paths present in each existing process graph included in the existing process graph DB 620 by using a predetermined graph analysis method. Here, "path" means a path used to move from the start point node to the end point node of the existing process graph. For example, to describe an example by referring to the first first existing process graph 422 illustrated in FIG. 4, there are four paths, namely, [in the order A, B, C, D, E, and O], [in the order A, B, C, M, E, and O], [in the order A, N, C, D, E, and O], and [in the order A, N, C, M, E, and O] in the existing process graph 422.

Here, the structure comparison unit 224 may determine a set of paths present in each existing process graph by analyzing each existing process graph included in the existing process graph DB 620 by using, for example, a so-called Hamiltonian Algorithm.

Next, in step S904, the structure comparison unit 224 determines, for each path determined in step S902, first node name information indicating the node name of each node included in the path for each existing process graph. Here, the structure comparison unit 224 may determine the first node name information indicating the node name of each node by using a predetermined natural language processing method. For example, by applying a predetermined natural language processing method to the first existing process graph 422 illustrated in FIG. 4, [A, B, C, D, E, O], [A, B, C, M, E, O], [A, N, C, D, E, O], and [A, N, C, M, E, O] may be determined as the first node name information indicating the node name of each node included in each path in the first existing process graph 422.

Next, in step S906, the structure comparison unit 224 determines second node name information indicating the node names of the nodes in the query graph included in the query data acquired from the user. Here, the structure comparison unit 224 may determine the second node name information by applying the natural language processing method used in step S904 to the query graph. Furthermore, in a case where the query graph includes a plurality of paths, the structure comparison unit 224 may specify each path in the query graph by means of the Hamilton algorithm as per step S902 and then determine the second node name information for each specified path. For example, [X, Y, Z] and [X, P, Z] may be determined as the second node name information indicating the node name of each node included in each path in the query graph 412 by applying a predetermined natural language processing method to the query graph 412 illustrated in FIG. 4.

Next, in step S908, the structure comparison unit 224 uses a predetermined natural language processing method to compare the first node name information determined in step S904 with the second node name information determined in step S906, and thus calculates, for each path, the structural similarity between the query graph and each existing process graph included in the set of existing process graphs, and obtains a value (probability value) for the structural similarity of the query graph to each path in each existing process graph. As an example, in a case where a path 1, a path 2, a path 3, and a path 4 are present in an existing process graph, the structure comparison unit 224 may determine that the structural similarity of the query graph to path 1 is "0.8", the structural similarity of the query graph to path 2 is "0.7", the structural similarity of the query graph to path 3 is "0.6", and the structural similarity of the query graph to path 4 is "0.5".

Here, as a natural language processing method for comparing the first node name information with the second node name information, any existing means may be used, and is not particularly limited in the present disclosure. The structural similarity value calculated here may be stored in the graph similarity information DB 233, for example.

Next, in step S910, the structure comparison unit 224 determines, as a first search candidate, an existing process graph satisfying a predetermined structural similarity threshold value for the query graph from among the set of existing process graphs. The predetermined structural similarity threshold value is information designating a lower limit (for example, 0.8 or more) of the structural similarity threshold value for the query graph, and may be set according to the degree of similarity required. In a certain embodiment, the structure comparison unit 224 may determine, as a first search candidate, an existing process graph having a path (for example, a path having the highest similarity to the query graph) that satisfies a threshold value for similarity to the query graph.

Furthermore, in a certain embodiment, the structure comparison unit 224 may calculate, for each existing process graph, an average value of the similarity for each existing process graph by using the structural similarity calculated for each path of the existing process graph, and determine, as a first search candidate, an existing process graph for which the average value of the similarity satisfies the threshold value for similarity to the query graph.

According to the structural similarity comparison processing 900 described above, an existing process graph having a high structural similarity to the query graph can be specified as one search candidate on the basis of the natural language information regarding the nodes constituting the query graph and each of the existing process graphs.

Next, content similarity comparison processing according to the embodiment of the present disclosure will be described with reference to FIG. 10.

Figure 10:
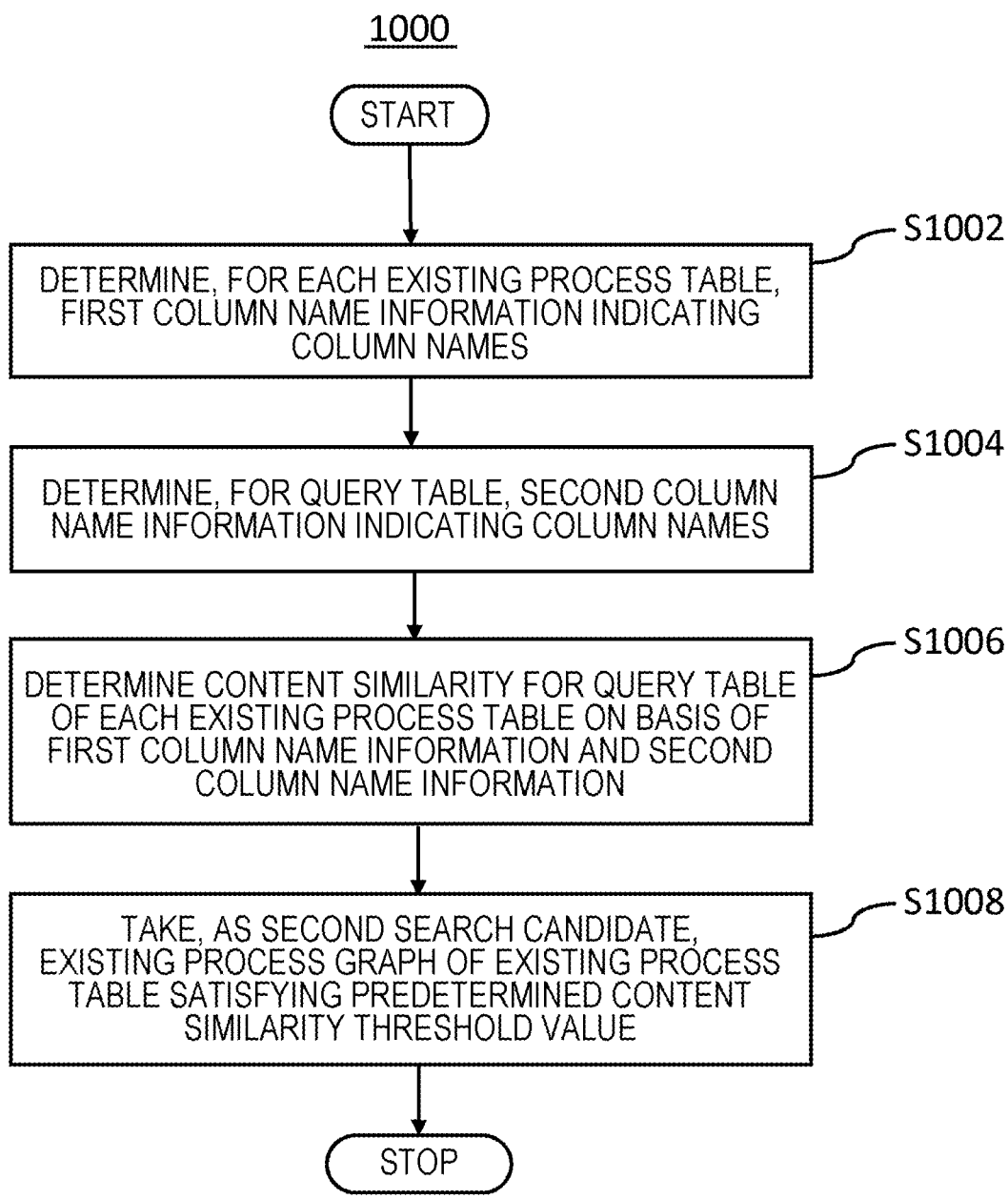
FIG. 10 is a diagram illustrating an example of the flow of content similarity comparison processing according to the embodiment of the present disclosure.

FIG. 10 is a diagram illustrating an example of the flow of content similarity comparison processing 1000 according to the embodiment of the present disclosure. The content similarity comparison processing 1000 is processing for calculating content similarity between the query table included in the query data acquired from the user and each existing process table included in the set of existing process tables, and is performed by the content comparison unit 226 of the graph search device 210 illustrated in FIG. 2.

As described above, "content similarity" in the present disclosure means similarity that takes into account syntactic and semantic features of table information storing graph-related information in table format. As will be described below, in the content similarity comparison processing 1000, the structural similarity between the query table and the existing process tables is calculated on the basis of the table information stored in each table.

First, in step S1002, the content comparison unit 226 uses a predetermined natural language processing method to determine, for each existing process table included in the existing process table DB 630, first column name information indicating the column names of columns present in each existing process table. Here, "column" means a column constituting an existing process table in table format. For example, referring to the process table 531 illustrated in FIG. 5, in the process table 531, [X1, Y1, P1, Z1] may be determined as the first column name information indicating the column names of the process table 531.

Next, in step S1004, the content comparison unit 226 uses a predetermined natural language processing method to determine second column name information indicating the column names of the columns present in the query table. Here, the content comparison unit 226 may use a natural language processing method similar to that of step S1002.

Next, in step S1006, the content comparison unit 226 calculates content similarity between the first column name information determined for each existing process table and the second column name information determined for the query table, and obtains a value (probability value) for the content similarity of the query table to each existing process table. Here, any existing means may be used as the natural language processing method for comparing the first column name information with the second column name information, and is not particularly limited in the present disclosure. The value of the content similarity calculated here may be stored in the graph similarity information DB 233, for example.

Note that the natural language processing method in this processing is a method for determining similarity on the basis of syntactic or semantic features of natural language information such as column name information or table information, and is not particularly limited in the present disclosure.

In this manner, columns for which the column names are similar between the query table and each existing process table can be specified.

Next, in step S1008, the content comparison unit 226 determines, as a second search candidate, a process graph associated with an existing process table that satisfies a predetermined content similarity criterion from within each existing process table on the basis of the content similarity between the first column name information and the second column name information calculated in step S1006.

More specifically, the content comparison unit 226 specifies, from within each existing process table, a first column set that satisfies a predetermined content similarity threshold value for a specific column set (referred to as the second column set) included in the query table. The content comparison unit 226 then determines, for each existing process table, content similarity between the first table information and the second table information by comparing the first table information stored in the first column set specified from within each existing process table, with the second table information stored in the second column set included in the query table.

Thereafter, the content comparison unit 226 may determine, as the second search candidate, an existing process graph associated with an existing process table that includes first table information satisfying a predetermined content similarity threshold value for the second table information, from among the set of existing process tables.

As a result, the content comparison unit 226 is capable of specifying an existing process table that includes a column having high content similarity to a column included in the query table on the basis of the content similarity comparison in step S1006, and then of determining the process graph associated with the existing process table as the second search candidate.

According to the content similarity comparison processing 1000 described above, by comparing table information stored in each of the query table and the existing process tables, an existing process graph associated with an existing process table having a high content similarity to the query table can be specified as one search candidate.

Next, a query data settings screen according to an embodiment of the present disclosure will be described with reference to FIG. 11.

Figure 11:
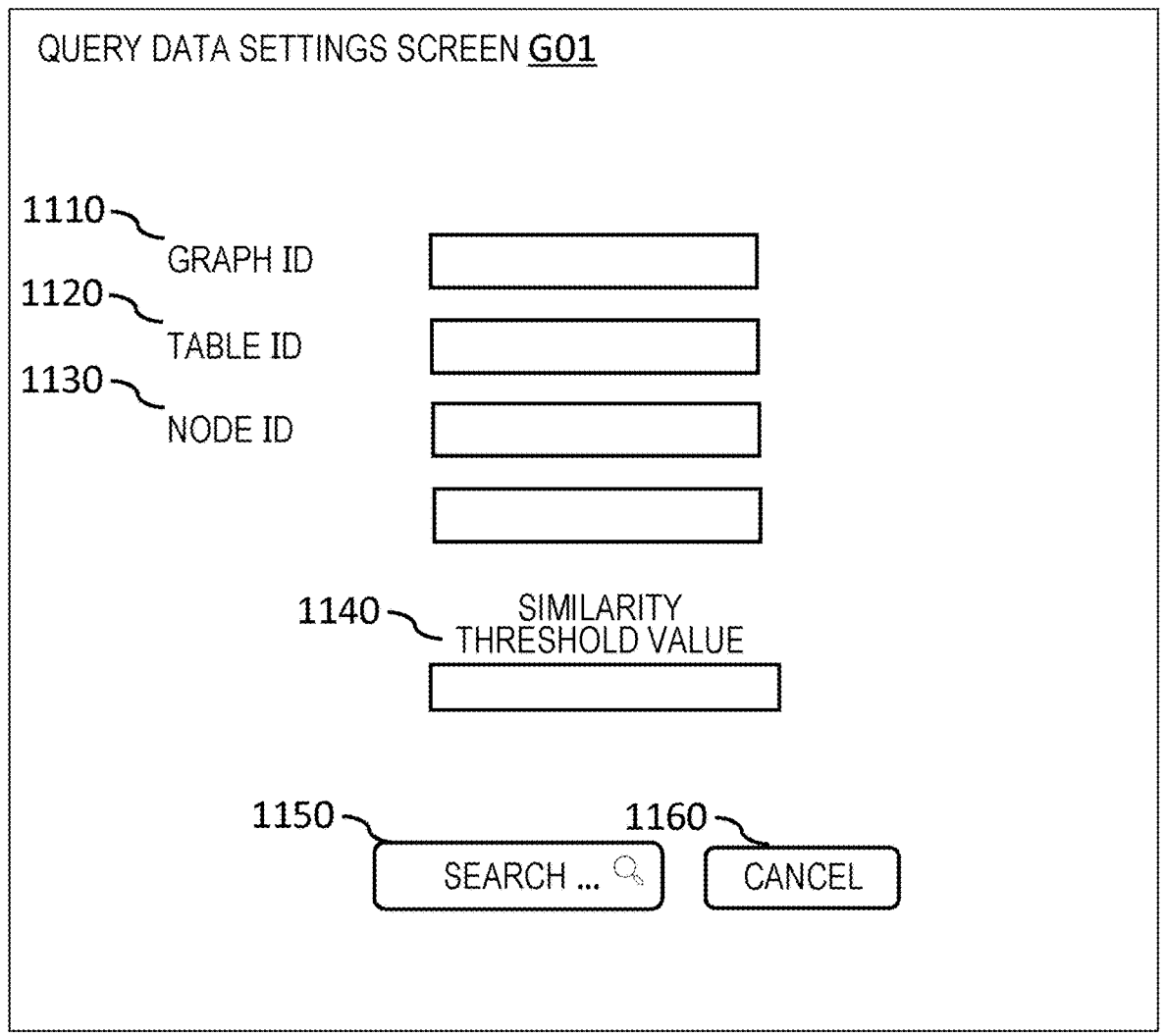
FIG. 11 is a diagram illustrating an example of a query data settings screen according to the embodiment of the present disclosure.

FIG. 11 is a diagram illustrating an example of a query data settings screen G01 according to the embodiment of the present disclosure. The query data settings screen G01 is a user interface screen for setting the query data according to the embodiment of the present disclosure, and may be provided to the user via the user terminal 260 illustrated in FIG. 2, for example.

As illustrated in FIG. 11, the query data settings screen G01 includes a graph ID setting window 1110, a table ID 1120, a node ID setting window 1130, a similarity threshold value setting window 1140, a search button 1150, and a cancel button 1160.

A graph ID setting window 1110 is an input window for designating a process graph used as a query graph in the query data. The user is able to set the query graph by inputting a graph ID identifying a previously created graph to be used as the query graph, in the graph ID setting window 1110.

A table ID setting window 1120 is an input window for designating a process table used as the query table in the query data. The user is able to set the query table by inputting, in the table ID setting window 1120, a table ID (for example, the table ID of the table associated with the query graph set in the graph ID setting window 1110) identifying a previously created table to be used as the query table.

The node ID setting window 1130 is an input window for designating each node in the query graph designated in the graph ID setting window 1110 or the query table designated in the table ID setting window 1120. The user is able to set the nodes constituting the query graph and the query table by inputting a node ID identifying each node in the query graph and the query table to the node ID setting window 1130.

A similarity threshold value setting window 1140 is an input window for setting a similarity threshold value requested by the user. The user is able to set the similarity threshold value used in the above-described structural similarity comparison or the content similarity comparison by inputting a predetermined similarity value to the similarity threshold value setting window 1140.

The search button 1150 is a button for performing a graph search for the query data according to a condition set by the user.

The cancel button 1160 is a button for clearing the data inputted to the query data settings screen G01 and canceling the graph search.

Next, a search results confirmation screen according to the embodiment of the present disclosure will be described with reference to FIG. 12.

FIG. 12 is a diagram illustrating an example of the search results confirmation screen G02 according to the embodiment of the present disclosure. The search results confirmation screen G02 is a user interface screen for confirming the similarity information and the search results according to the embodiment of the present disclosure, and may be provided to the user via the user terminal 260 illustrated in FIG. 2, for example.

As illustrated in FIG. 12, the search results confirmation screen G02 includes a similarity comparison results table 1210 and a search results data table 1220.

The similarity comparison results table 1210 is a table indicating search candidates determined by a similarity comparison between predetermined query data and existing information stored in the existing information DB 232. As illustrated in FIG. 12, the similarity comparison results table 1210 may include a graph ID 1211 of a process graph which is a search candidate for the query data, a node ID 1212 identifying nodes included in each process graph, a structural similarity 1213 of the process graph to the query graph, a content similarity 1214 of a process table associated with the graph, to the query table, and a table ID identifying a table associated with the process graph.

The search results data table 1220 is a table indicating information on a specific search candidate (for example, a process graph selected as search results data for the query data) among the search candidates indicated in the similarity comparison results table 1210. As illustrated in FIG. 12, the search results data table 1220 may include a graph ID 1221 identifying a graph being selected, a node ID 1222 identifying each node in the process graph, a table ID 1223 identifying a process table associated with the process graph, and table information 1224 stored in each column in the process table.

As described above, one aspect of the graph search means according to the embodiment of the present disclosure relates to a similarity comparison that takes into account the structure of a process graph and table information stored in a table associated with the process graph.

More specifically, by specifying node name information of nodes included in the process graph and using a natural language processing method to compare node name information of different process graphs, it is possible to specify an existing process graph that includes nodes similar to a predetermined process graph (for example, a query graph) and that has a similar structure.

In addition, by using a natural language processing method to compare table information stored in process tables associated with different process graphs, it is possible to specify an existing process table having similar content and storing similar information to a predetermined process table (for example, the query table) and specify a process graph associated with the existing process table.

As described above, by performing a graph search based on a plurality of viewpoints of structural similarity and content similarity, it is possible to provide a reliable search result, for example, even in a case where a highly complex graph associated with various types of information regarding a product manufacturing process is used. For example, according to the graph search means according to the embodiment of the present disclosure, it is possible to provide search results which include a process graph that does not include similar nodes (in other words, which is structurally dissimilar) but has similar content, for example.

As described above, the graph search means according to the embodiment of the present disclosure includes the following aspects.

(Mode 1)

A graph search device including:
a processor; a memory; and a storage unit, in which
the storage unit includes an existing information database storing existing information that includes a set of existing process graphs indicating a flow of a process in graph format and a set of existing process tables associated with the set of existing process graphs and storing information regarding the set of existing process graphs in table format, and
the memory includes processing instructions for causing the processor to function as:
a query data management unit that acquires query data that is a search query for the existing information and that includes a query graph and a query table;
a structure comparison unit that compares the query graph included in the query data with the set of existing process graphs to calculate a structural similarity between the query graph and the set of existing process graphs, and determines, as a first search candidate, an existing process graph satisfying a predetermined structural similarity threshold value with respect to the query graph from among the set of existing process graphs;
a content comparison unit that compares the query table included in the query data with the set of existing process tables to calculate a content similarity between the query graph and the set of existing process tables, and determines, as a second search candidate, an existing process graph associated with an existing process table satisfying a predetermined content similarity threshold value for the query table, from among the set of existing process tables; and
a results management unit that determines search results data for the query data among the first search candidate and the second search candidate on the basis of a predetermined comprehensive evaluation criterion, and outputs the search results data.

(Mode 2)

The graph search device according to Mode 1, in which the structure comparison unit
determines a set of paths present in each existing process graph included in the set of existing process graphs by using a predetermined graph analysis method to analyze the set of existing process graphs,
determines, for each path included in the set of determined paths, first node name information indicating a node name of each node included in the path for each existing process graph by using a predetermined natural language process method,
determines second node name information indicating a node name of each node included in the query graph by using a predetermined natural language process method, and
compares, using a predetermined natural language processing method, the first node name information determined for each existing process graph with the second node name information to calculate the structural similarity between the query graph and the set of existing process graphs, and determines, as the first search candidate, an existing process graph satisfying a predetermined structural similarity threshold value for the query graph, from among the set of existing process graphs.

(Mode 3)

The graph search device according to Mode 1 or 2, in which the content comparison unit determines, for each existing process table, first column name information indicating a column name of a column present in each existing process table included in the set of existing process tables, by using a predetermined natural language processing method, determines second column name information indicating a column name of a column included in the query table by using a predetermined natural language processing method, compares, using a predetermined natural language processing method, the first column name information determined for each existing process table with the second column name information to calculate a content similarity between the first column name information and the second column name information, and specifies, from within each existing process table, a first column set satisfying a predetermined content similarity threshold value for a second column set included in the query table, and compares first table information stored in the first column set specified from within each existing process table with second table information stored in a second column set included in the query table to determine, for each existing process table, content similarity between the first table information and the second table information, and determines, as the second search candidate, an existing process graph associated with an existing process table that includes first table information satisfying a predetermined content similarity threshold value with respect to the second table information, from among the set of existing process tables.

(Mode 4)

The graph search device according to any one of Modes 1 to 3, in which the results management unit compares the structural similarity calculated for the first search candidate with the content similarity calculated for the second search candidate, and determines a search candidate satisfying the comprehensive evaluation criterion as the search results data.

(Mode 5)

The graph search device according to any one of Modes 1 to 4, in which the results management unit determines, as the search results data, a search candidate that satisfies a predetermined efficiency criterion related to time, cost, or quality among the first search candidate and the second search candidate.

(Mode 6)

The graph search device according to any one of Modes 1 to 5, in which the results management unit displays, on a user interface screen as the results data, a graph ID identifying a specific existing process graph which is a search candidate satisfying the comprehensive evaluation criterion, a table ID identifying an existing process table associated with the specific existing process graph, a node ID identifying a node included in the specific existing process graph, the structural similarity calculated for the specific existing process graph, and the content similarity calculated for the specific existing process graph.

Although an embodiment of the present invention has been described above, the present invention is not limited to or by the above-described embodiment, and various modifications can be made without departing from the spirit of the present invention.

What is claimed is:

1. A graph search device comprising:
a processor;
a memory coupled to the processor; and
a storage unit,
wherein the storage unit includes an existing information database storing existing information that includes a set of existing process graphs indicating a flow of a process in graph format and a set of existing process tables associated with the set of existing process graphs and storing information regarding the set of existing process graphs in table format, and
wherein the memory includes processing instructions for causing the processor to function as:
a query data management unit that acquires query data that is a search query for the existing information and that includes a query graph and a query table;
a structure comparison unit that compares the query graph included in the query data with the set of existing process graphs to calculate a structural similarity between the query graph and the set of existing process graphs, and determines, as a first search candidate, an existing process graph satisfying a predetermined structural similarity threshold value with respect to the query graph from among the set of existing process graphs;
a content comparison unit that compares the query table included in the query data with the set of existing process tables to calculate a content similarity between the query graph and the set of existing process tables, and determines, as a second search candidate, an existing process graph associated with an existing process table satisfying a predetermined content similarity threshold value for the query table, from among the set of existing process tables; and
a results management unit that determines search results data for the query data among the first search candidate and the second search candidate on the basis of a predetermined comprehensive evaluation criterion, outputs the search results data, and displays, on a user interface screen, as the search results data, a graph ID identifying a specific existing process graph which is a search candidate satisfying the comprehensive evaluation criterion, a table ID identifying an existing process table associated with the specific existing process graph, a node ID identifying a node included in the specific existing process graph, the structural similarity calculated for the specific existing process graph, and the content similarity calculated for the specific existing process graph.

2. The graph search device according to claim 1,
wherein the structure comparison unite:
determines a set of paths present in each existing process graph included in the set of existing process graphs by using a predetermined graph analysis method to analyze the set of existing process graphs,
determines, for each path included in the set of determined paths, first node name information indicating a node name of each node included in the path for each existing process graph by using a predetermined natural language process method,
determines second node name information indicating a node name of each node included in the query graph by using a predetermined natural language process method, and
compares, using a predetermined natural language processing method, the first node name information determined for each existing process graph with the second node name information to calculate the structural similarity between the query graph and the set of existing process graphs, and determine, as the first search candidate, an existing process graph satisfying a predetermined structural similarity threshold value for the query graph, from among the set of existing process graphs.

3. The graph search device according to claim 1, wherein the content comparison unit:

determines, for each existing process table, first column name information indicating a column name of a column present in each existing process table included in the set of existing process tables, by using a predetermined natural language processing method, determines second column name information indicating a column name of a column included in the query table by using a predetermined natural language processing method, compares, using a predetermined natural language processing method, the first column name information determined for each existing process table with the second column name information to calculate a content similarity between the first column name information and the second column name information, and specify, from within each existing process table, a first column set satisfying a predetermined content similarity threshold value for a second column set included in the query table, and compares first table information stored in the first column set specified from within each existing process table with second table information stored in a second column set included in the query table to determine, for each existing process table, content similarity between the first table information and the second table information, and determine, as the second search candidate, an existing process graph associated with an existing process table that includes first table information satisfying a predetermined content similarity threshold value with respect to the second table information, from among the set of existing process tables.

4. The graph search device according to claim 1, wherein the results management unit compares the structural similarity calculated for the first search candidate with the content similarity calculated for the second search candidate, and determines a search candidate satisfying the comprehensive evaluation criterion as the search results data.

5. The graph search device according to claim 1, wherein the results management unit determines, as the search results data, a search candidate that satisfies a predetermined efficiency criterion related to time, cost, or quality among the first search candidate and the second search candidate.

6. A graph search system, comprising:
a graph search device for performing a graph search; and
a user terminal connected via a communication network,
wherein the graph search device comprises: a processor; a memory; and a storage unit,
wherein the storage unit includes an existing information database storing existing information that includes a set of existing process graphs indicating a flow of a process in graph format and a set of existing process tables associated with the set of existing process graphs and storing information regarding the set of existing process graphs in table format, and
wherein the memory includes processing instructions for causing the processor to function as:

a query data management unit that acquires, from the user terminal, query data that is a search query for the existing information and that includes a query graph and a query table;

a structure comparison unit that compares the query graph included in the query data with the set of existing process graphs to calculate a structural similarity between the query graph and the set of existing process graphs, and determine, as a first search candidate, an existing process graph satisfying a predetermined structural similarity threshold value with respect to the query graph, from among the set of existing process graphs;

a content comparison unit that compares the query table included in the query data with the set of existing process tables to calculate a content similarity between the query graph and the set of existing process tables, and determine, as a second search candidate, an existing process graph associated with an existing process table satisfying a predetermined content similarity threshold value for the query table, from among the set of existing process tables; and a results management unit that determines search results data for the query data among the first search candidate and the second search candidate based on a predetermined comprehensive evaluation criterion, transmits the search results data to the user terminal, and displays, on a user interface screen, as the search results data, a graph ID identifying a specific existing process graph which is a search candidate satisfying the comprehensive evaluation criterion, a table ID identifying an existing process table associated with the specific existing process graph, a node ID identifying a node included in the specific existing process graph, the structural similarity calculated for the specific existing process graph, and the content similarity calculated for the specific existing process graph.

7. A graph search method, comprising:
constituting an existing information database storing existing information that includes a set of existing process graphs indicating a flow of a process in graph format and a set of existing process tables associated with the set of existing process graphs and storing information regarding the set of existing process graphs in table format;

acquiring query data that is a search query for the existing information and that includes a query graph and a query table;

determining a set of paths present in each existing process graph included in the set of existing process graphs by using a predetermined graph analysis method to analyze the set of existing process graphs;

determining, for each path included in the set of determined paths, first node name information indicating a node name of each node included in the path for each existing process graph by using a predetermined natural language process method;

determining second node name information indicating a node name of each node included in the query graph by using a predetermined natural language process method;

comparing, using a predetermined natural language processing method, the first node name information determined for each existing process graph with the second node name information to calculate a structural similarity between the query graph and the set of existing process graphs, and determine, as a first search candidate, an existing process graph satisfying a predetermined structural similarity threshold value for the query graph, from among the set of existing process graphs;

determining, for each existing process table, first column name information indicating a column name of a column present in each existing process table included in the set of existing process tables, by using a predetermined natural language processing method;

determining second column name information indicating a column name of a column included in the query table by using a predetermined natural language processing method;

comparing, using a predetermined natural language processing method, the first column name information determined for each existing process table with the second column name information to calculate a content similarity between the first column name information and the second column name information, and specify, from within each existing process table, a first column set satisfying a predetermined content similarity threshold value for a second column set included in the query table;

comparing first table information stored in the first column set specified from within each existing process table with second table information stored in a second column set included in the query table to determine, for each existing process table, content similarity between the first table information and the second table information, and determine, as the second search candidate, an existing process graph associated with an existing process table that includes first table information satisfying a predetermined content similarity threshold value with respect to the second table information, from among the set of existing process tables;

determining search results data for the query data among the first search candidate and the second search candidate based on a predetermined comprehensive evaluation criterion, and outputting the search results data; and displaying, on a user interface screen, as the search results data, a graph ID identifying a specific existing process graph which is a search candidate satisfying the comprehensive evaluation criterion, a table ID identifying an existing process table associated with the specific existing process graph, a node ID identifying a node included in the specific existing process graph, the structural similarity calculated for the specific existing process graph, and the content similarity calculated for the specific existing process graph.

* * * * *